Feb. 28, 1961   P. G. TURNER ET AL   2,972,807
METHOD OF MAKING HOLLOW TURBINE OR COMPRESSOR BLADES
Filed Feb. 18, 1958

PHILIP G. TURNER
GEORGE R. STUART
INVENTORS

BY Q. H. Deller
ATTORNEY 2,972,807

METHOD OF MAKING HOLLOW TURBINE OR COMPRESSOR BLADES

Philip George Turner, Inkberrow, and George Robert Stuart, Thornliebank, England, assignors to The International Nickel Company, Inc., New York, N.Y., a corporation of Delaware Filed Feb. 18, 1958, Ser. No. 715,977

Claims priority, application Great Britain Feb. 19, 1957

3 Claims. (Cl. 29—156.8)

The present invention relates to the production of turbine blades and, more particularly, to the production of fluid-cooled turbine blades containing cooling passages therein.

It has been proposed to make a turbine (or compressor) blade with an integral root and internal cooling passages by the partial extrusion of a billet or the like with longitudinal holes filled with a material that flows with the metal and can be removed after the extrusion. Advantageously, the holes are made blind so that they extend only a little way into that part of the metal which upon extrusion will form the root and consequently will not pass through the extrusion die; and after the extrusion one or more holes of cross section different from that of the blind holes is or are made in the root to connect with the original holes. By means of previous work, we have found that the part of the billet in which the closed ends of the blind holes lie is undisturbed during the extrusion, so the parts of these holes in it are likewise undisturbed positionally. Therefore, the position of the holes in the root is known with accuracy and this is of considerable advantage, as the holes can be reached with certainty by drilling.

This process presents a disadvantage, however, namely, that the partially extruded billet is difficult to put accurately into a jig for the drilling of the holes in the root.

Although attempts were made to overcome the foregoing difficulty and other disadvantages, none, as we are aware, was entirely successful when carried into practice commercially on an industrial scale.

It has now been discovered that by the use of a special process step the foregoing disadvantage may be overcome.

It is an object of the present invention to provide an improved process for the production of a hollow turbine blade.

Another object of the invention is to provide an improved process for the production of a hollow turbine blade whereby sources of potential weakness in said blade are minimized.

Other objects and advantages will become apparent from the following description taken in conjunction with the accompanying drawing in which.

Generally speaking, the present invention contemplates an improvement wherein the aforesaid process is modified to avoid the foregoing disadvantage. In that part of the billet which is to form the blade proper, substantially longitudinal holes are made which extend a little way into the part which is to form the root. These holes are then filled with a removable filler. Before the extrusion, holes of smaller cross section are drilled from the periphery of the root portion through the part which is to form the root to connect with, and spigot into said longitudinal holes. These holes may be at any desired angle to the center line of the span of the blade, but they must meet the other holes, i.e., each of the holes of smaller cross section must connect with one or more of the larger holes. The billet used is of simple geometrical form (usually of parallelepiped form) and thus easily and accurately jigged, so the small holes can still be exactly located. The small holes should be filled with filler material before the extrusion, so that they will not be deformed during the extrusion, even though the part of the billet in which they are made does not pass through the die of the extrusion press and may fit the container of the press closely.

The present invention which comprises forming and filling each of the large holes before drilling the smaller holes and making these smaller holes penetrate into the filler for a short distance, so that filler subsequently put in each smaller hole will form a spigot in the filler in a larger hole is particularly advantageous in that the smaller secondary hole may meet the larger primary hole fairly and squarely. Sharp corners at the juncture of the primary and secondary holes may be eliminated. After the extrusion and removal of the filler, usually by acid leaching, the internal contours of the holes will be smooth, thereby eliminating sources of weakness in the final blade due to burrs at the point of junction between the small and large holes.

If any work required on the root of a blade made according to the present invention is performed before the filler is removed, there will be no risk of fine holes close to the surface collapsing.

Figure 1:
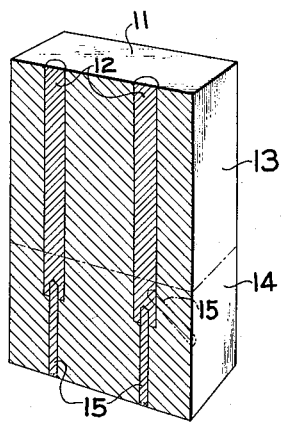
Figure 1 shows in section, a drilled and filled parallelepipedal billet as contemplated by the present invention.
Figure 2:
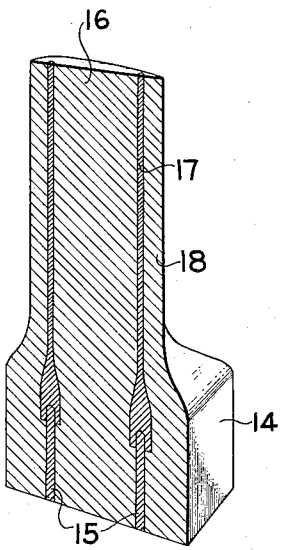
Fig. 2 depicts the billet of Figure 1 after extrusion as contemplated by the present invention.

In carrying the invention into practice, it is preferred to utilize a billet of substantially parallelepiped form, such as illustrated in the drawing. Referring now thereto, in Figure 1 parallelepipedal billet 11 made of heat-resistant metal is provided with longitudinal filled holes 12 which extend through predetermined blade portion 13 and only a little way into root portion 14. Small holes 15 are then drilled to meet and dowel into or to form a spigot in larger longitudinal filled holes 12. Small holes 15 are then filled with filler material. Billet 11 is then partly extruded longitudinally with blade portion 13 leading, forming partly extruded blank 16. Blank 16 contains extruded filled holes 17 in extruded blade portion 18 and small drilled and filled holes 15 in unextruded root portion 14. Thereafter, blank 16 may be worked, machined, polished, etc., to form a finished turbine blade. At any convenient stage after working is completed, the filler may be removed from holes 15 and 17 in the blank to provide cooling passages therein.

With respect to the manufacture of turbine blades by means of the novel process, it should be understood that the term "heat-resistant metal" is used to include austenitic nickel-chromium alloys, including nickel-chromium-iron and nickel-chromium-cobalt and cobalt-chromium alloys, including cobalt-chromium-iron alloys, which contain a total of at least about 25% nickel plus chromium, cobalt plus chromium or nickel plus chromium plus cobalt (i.e., a total of at least about 25% of chromium plus nickel and/or cobalt), in addition to small amounts of aluminum, titanium, vanadium, molybdenum, tungsten, niobium, tantalum, silicon, manganese, zirconium and boron which may optionally be present in the alloys. These alloys are adapted to be subjected in use to temperatures up to about 700° C. or above and, accordingly, must be hot worked at temperatures around 1200° C. Fillers adapted to cooperate with such heat-resistant metal may be ferritic alloys of iron, manganese and titanium containing from about 5% to about 20% manganese, about 1% to about 10% titanium with the balance essentially iron. Other fillers may be mixtures of ceramic material such as magnesia and metal such as iron, with the metal being the continuous phase and the ceramic material constituting between about 5% and 25% of the composition by weight. Advantageously, these fillers may be removed from the heat-resistant metal by selective dissolution in common aqueous mineral acid solutions.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for the production of a turbine blade blank having cooling passages therein which comprises providing a billet of simple geometrical form having a predetermined root portion and blade portion; drilling from the tip end of the blade portion and filling a plurality of holes extending into the root portion and through the blade portion thereof; thereafter drilling from the periphery of the root portion and filling at least one auxiliary smaller hole which extends from the periphery of the root portion to connect with and penetrate the bottom part of at least one of the originally drilled and filled holes extending into the root portion to provide a continuous filled passage from each of said originally drilled and filled larger holes to the periphery of said root portion; partially extruding the drilled and filled billet with blade portion leading to provide an extruded blade portion and an unextruded root portion; and thereafter removing the filler from the formed turbine blade blank.

2. A process for the production of a turbine blade blank having cooling passages therein which comprises providing a billet of simple geometrical form having a predetermined root portion and blade portion; drilling from the tip end of the blade portion and filling a plurality of holes extending into the root portion and through the blade portion thereof; thereafter drilling from the periphery of the root portion and filling a plurality of auxiliary smaller holes, each of which extend from the periphery of the root portion to connect with and penetrate the bottom part of one of the originally drilled and filled larger holes extending into said root portion; partially extruding the drilled and filled billet with blade portion leading to provide an extruded blade portion and an unextruded root portion; and thereafter removing the filler from the formed turbine blade blank.

3. A process for the production of a fluid-cooled turbine blade blank having cooling passages extending therethrough which comprises providing a substantially parallelepipedal billet of heat-resisting metal having a blade portion and a root portion; thereafter drilling from the tip end of the blade portion and filling a plurality of substantially longitudinal holes therein which extend through said blade portion and into said root portion; drilling from the periphery of the root portion and filling a plurality of smaller holes in the root portion of said billet, each of which holes terminates on the periphery of the root and extends into the filler in the bottom part of one of said filled larger longitudinal holes to form a spigot in said filler; partially extruding the filled billet to provide a turbine blade blank having an extruded blade portion and an unextruded root portion; and thereafter removing the filler from the filled holes in said turbine blade blank to provide cooling passages therein.

References Cited in the file of this patent

UNITED STATES PATENTS

| | | |
|---|---|---|
| 1,748,364 | Ray | Feb. 25, 1930 |
| 2,013,622 | Bedford et al. | Sept. 3, 1935 |
| 2,628,417 | Peyches | Feb. 17, 1953 |
| 2,830,357 | Tunstall et al. | Apr. 15, 1958 |

FOREIGN PATENTS

| | | |
|---|---|---|
| 755,610 | Great Britain | Aug. 22, 1956 |
| 763,141 | Great Britain | Dec. 5, 1956 |